L. LEWITZKY.
BAKING PAN.
APPLICATION FILED NOV. 17, 1919.
1,340,659.
Patented May 18, 1920.
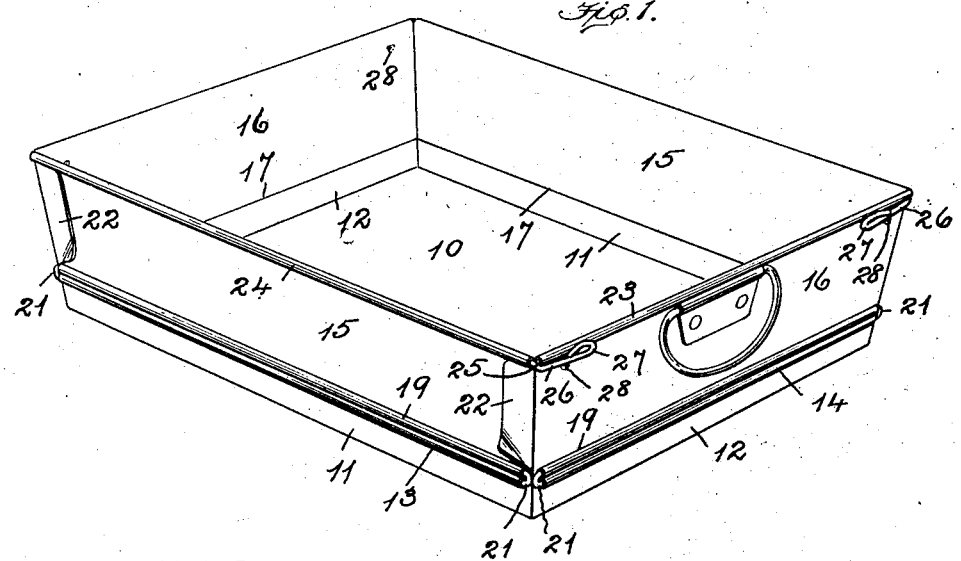
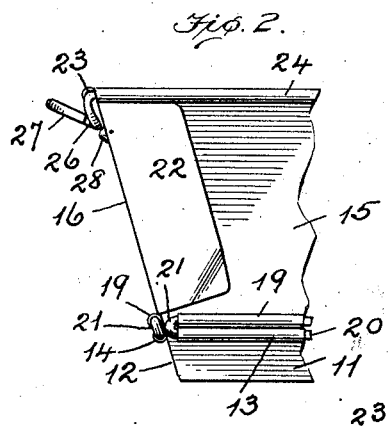
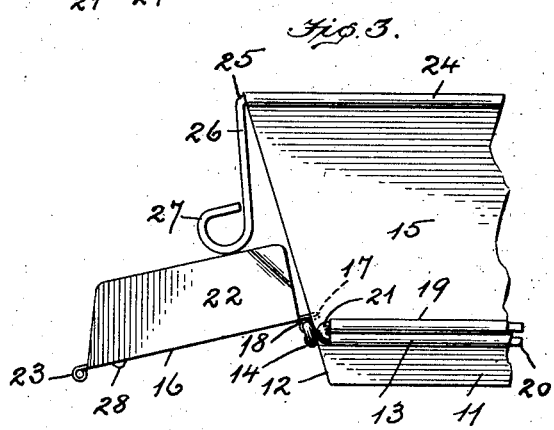
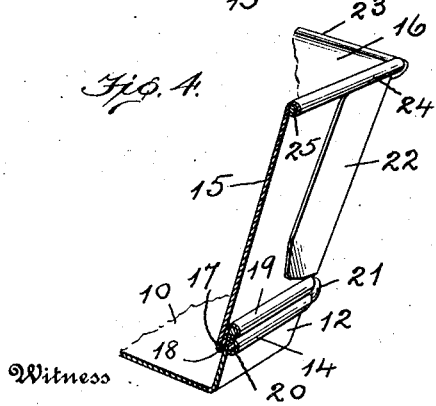
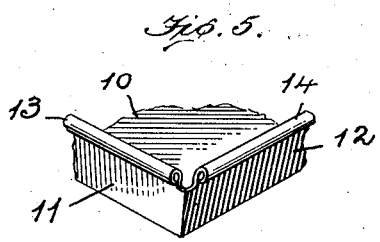
Witness
Edwin L. Bradford
Inventor
Lottie Lewitzky
By
Mann & Co.
Attorneys

UNITED STATES PATENT OFFICE.

LOTTIE LEWITZKY, OF PHILADELPHIA, PENNSYLVANIA.

BAKING-PAN.

1,340,659.  Specification of Letters Patent.  Patented May 18, 1920.

Application filed November 17, 1919. Serial No. 338,437.

*To all whom it may concern:*

Be it known that I, LOTTIE LEWITZKY, a citizen of the United States, residing at Philadelphia, in the county of Philadelphia and State of Pennsylvania, have invented certain new and useful Improvements in Baking-Pans, of which the following is a specification.

This invention relates to improvements in baking pans and has for its object to provide an improved construction of pan and one with walls that are hinged in a novel manner with respect to the bottom.

The invention is illustrated in the accompanying drawing wherein,—

Figure 1, shows the improved pan in perspective.

Fig. 2, illustrates on a slightly enlarged scale one end of the pan as viewed from the side thereof.

Fig. 3, shows the same but with the end wall swung down.

Fig. 4, illustrates a sectional and perspective view of the pan bottom and side wall, and Fig. 5, shows in perspective one corner of the pan bottom.

Referring to the drawing the numeral 10, designates the pan bottom which is provided with upwardly extending side and end walls 11 and 12 respectively whereby the walls and the bottom will form a shallow pan in themselves.

The upper edge of each of the side and end walls is provided with a continuous outturned roll 13 and 14 which form tubular structures along said edges. These tubes 13 and 14 are slightly shorter than the walls from which they are formed.

In carrying out my invention I employ movable side and end walls 15 and 16, both of which have like hinge structures and a description of one will apply equally to the other.

By referring to Fig. 4, of the drawing it will be seen that the movable wall, whether it be a side or end wall, is provided along its lower edge with a fold 17, whereby to produce an upturned flap 18, along its outer side. The upper edge of this flap is rolled over to form a tube 19, which latter is of a slightly less length in a horizontal direction than the wall from which the flap is formed.

The movable walls have their tubes 19, located parallel with and directly over the horizontal tubes 13 and 14, of the shallow bottom pan-walls 11 and 12, as clearly shown in Figs. 3 and 4 of the drawings, and the folded edge 17, of the movable walls has position below the tubes on the shallow bottom pan-walls and on the inner side of the latter also as clearly shown in Fig. 4.

To produce a hinge joint between the movable walls and the fixed pan-bottom walls, I pass a wire 20, through the lower tube 13 or 14, as the case may be, then form a return bend 21, at each end of the tube and pass the two ends of the wire into the upper tube 19, on the flap 18 of the movable wall. These wires 20, therefore, serve the double purpose of reinforcing the interior of the tubes and also act as the pintles on which the walls may swing. The return bends 21, in the wires lock the wires in the tubes and prevent them from moving longitudinally.

The two movable end walls 16, are provided with forwardly-extending end flanges 22, which lap the ends of the side walls and prevent the latter from swinging outwardly, while the folded edge 17, on the bottom edges of the movable walls by depending below and on the inside of the pan-bottom walls 11 and 12, form an inside stop to limit the inward movement of the movable walls.

The upper edges of the end walls 16, are preferably rolled at 23, and internally wired to reinforce them, while the upper edges of the side walls 15, are provided with tubular rolls 24, through which wires 25, loosely extend and project from the ends thereof. These projecting wire ends are bent laterally to form locking arms 26 and are preferably provided with loops 27, at their free ends to facilitate their operation by the fingers.

The end walls 16, are provided with outwardly-extending bumps 28, over which the locking arms 26, may be sprung to hold the latter in the engaged position, and thereby keep the end walls raised.

Having described my invention, I claim—

1. The combination with a shallow pan having a bottom and up-standing side and end walls and each of said walls being provided with a tubular roll at its upper edge, of movable walls for each side and each end wall of the shallow pan and each movable wall having its lowermost edge projecting down into the shallow pan and at the inner side of the walls of the latter and means on the outside of the movable walls and spaced above the lower edges of the latter for pivotally connecting said walls to the tubular rolls on the shallow pan walls.

2. The combination with a shallow pan having a bottom and up-standing side and end walls and each of said walls having a tubular roll at its upper edge, of a movable wall for each of the walls of the shallow pan and each movable wall having an up-turned flap on its outer side, and means for pivotally connecting the up-turned flaps of the movable walls with the tubular rolls on the upper edges of the shallow pan-walls.

3. The combination with a shallow pan having a bottom and up-standing side and end walls and each of said side walls having a tubular roll along its upper edge, of a movable wall for each shallow pan-wall and each movable wall having a fold along its lowermost edge to produce an up-turned outside flap thereon, said flaps being provided along their upper edges with a tubular roll that is elevated with respect to the said wall fold, and a pintle wire extending from the ends of the roll on the movable wall down and into the roll on the upper edge of the shallow pan wall to pivotally connect the movable wall to the pan wall at the outer side of the fold and flap.

In testimony whereof I affix my signature.

LOTTIE LEWITZKY.